(12) United States Patent
Hogue et al.

(10) Patent No.: US 6,991,423 B2
(45) Date of Patent: Jan. 31, 2006

(54) HIGH-SPEED STACKER

(75) Inventors: Gary Wayne Hogue, West Linn, OR (US); Brian Cornelius Hogue, West Linn, OR (US); Steven M. Colligan, Portland, OR (US)

(73) Assignee: Hogue Industries, LLC, West Linn, OR (US)

( * ) Notice: Subject to any disclaimer, the term of this patent is extended or adjusted under 35 U.S.C. 154(b) by 0 days.

(21) Appl. No.: 10/801,524

(22) Filed: Mar. 12, 2004

(65) Prior Publication Data

US 2005/0106000 A1      May 19, 2005

Related U.S. Application Data

(60) Provisional application No. 60/520,550, filed on Nov. 14, 2003.

(51) Int. Cl.
    *B65G 57/18*       (2006.01)
(52) U.S. Cl. ................. 414/791.6; 414/793.4
(58) Field of Classification Search ............. 414/791.6, 414/793.5, 794.1, 794.3, 793.4
    See application file for complete search history.

(56) References Cited

U.S. PATENT DOCUMENTS

| | | | | |
|---|---|---|---|---|
| 3,908,834 A | * | 9/1975 | Lunden | 414/794.1 |
| 4,290,723 A | | 9/1981 | Johansson | 414/83 |
| 4,902,195 A | * | 2/1990 | Lucas | 414/799 |
| 5,613,827 A | | 3/1997 | Vande Linde | 414/791.6 |
| 5,636,967 A | * | 6/1997 | Green et al. | 414/793.4 |
| 5,720,592 A | * | 2/1998 | Gillingham et al. | 414/789.5 |
| 6,007,295 A | * | 12/1999 | Sears et al. | 414/789.5 |
| 6,238,174 B1 | * | 5/2001 | Faerber | 414/789.5 |
| 6,598,747 B1 | | 7/2003 | Ahrens | 209/518 |
| 6,655,902 B2 | | 12/2003 | Dube et al. | 414/789.5 |
| 2003/0031550 A1 | | 2/2003 | Dube et al. | 414/789.5 |

OTHER PUBLICATIONS

Carbotech, Stacker Brochure, 2 pages.
Carbotech, High-Speed Stacker Brochure, 2 pages.
Comact, Double fork high-speed stacker, http://www.comact.com/us/sawmill-product.php?nID=33, 2 pages.
Mill Tech Industries, Dual for stacker, http://www.mill-tech-ind.com/products.php?cat=2, 1 page.

* cited by examiner

*Primary Examiner*—Douglas Hess
(74) *Attorney, Agent, or Firm*—Marger Johnson & McCollom

(57) ABSTRACT

A high-speed stacker preferably includes dual stacking arms configured to operate complementary to one another. Most preferably, an electronic control system is provided to enable precise control over the speed and positioning of the stacker arms in both horizontal and vertical orientations. Linear motion devices (such as hydraulic cylinders, screw drive linear actuators, or other devices) can be used to position the arms horizontally and vertically in response to instructions from the electronic control system. In operation, the electronic control system preferably controls the speed and ramping of the stacker arms to repeatedly move courses of material from a feed system to a stacking area at a rapid rate with little maintenance. The high-speed stacker can also be configured to operate fewer than all of the stacker arms to facilitate faster stacking of smaller courses of material.

19 Claims, 15 Drawing Sheets

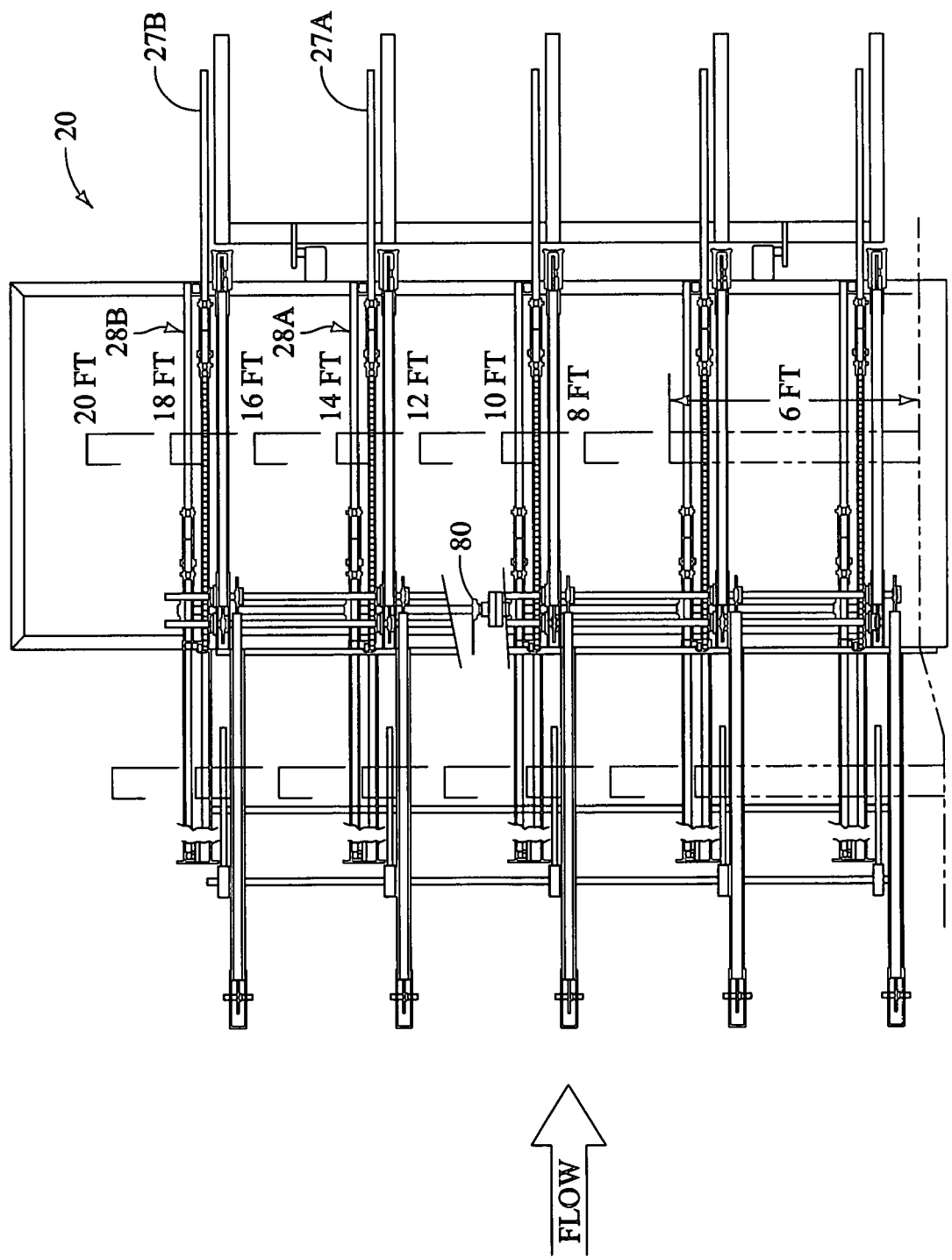

HIGH-SPEED STACKER

This application claims priority from U.S. Provisional Application Ser. No. 60/520,550, filed Nov. 14, 2003, the contents of which are incorporated herein by reference in their entirety.

BACKGROUND OF THE INVENTION

1. Field of the Invention

The present invention relates generally to methods and machines for stacking material, and more particularly, to methods and machines for stacking elongated planar members, such as sheets of lumber, plywood, or other material, into packages to facilitate subsequent shipping and/or handling.

2. Description of Related Art

The lumber industry, in particular, uses stacking machines (or stackers) to collect sheets (or pieces) of lumber, plywood, and other wood products into packages (or bundles) to facilitate bulk handling and shipping. Lumber is generally produced in lengths between 4' to 28', with thicknesses ranging from 1" to 12", and having widths that range between 2" to 24". After production, the lumber is generally gathered into layers (or courses) and then supplied to a stacker where it is formulated into packages that are typically approximately 16 to 30+layers high and range from about 42" to 96" in width.

The stacking process requires robust machinery. It is also desirable to have a stacker that is capable of efficiently stacking the lumber at a very high speed. It is further desirable to have stacking machinery that is easy to maintain and that requires very little supervision or manual tuning during the stacking process. The longer the machines are kept up and running between down times and the less manual intervention that is required, the better the process efficiency. Greater efficiency results in increased production and enhanced profitability.

The industry is therefore in need of faster and more reliable methods and systems for stacking the materials that are to be bundled together. In particular, in sawmills and planer mills that manufacture lumber and other wood products, the speed of equipment that feeds conventional stackers has been increased, without a corresponding increase in the stacking speed. This results in bottlenecks and inefficiencies at the stackers.

Conventional stackers are generally unable to meet the high demands placed on them by current lumber feed systems. Typically, a package of lumber is formed in the stacker using a set of forks (or stacker arms) to raise a course of lumber from stacker chains. The arms are then extended to an area containing the accumulated courses. Once the course of lumber has been set on top of the stack, the stacker arms retreat to pick up the next course. This process is repeated until the desired number of courses have been set and a full package has been created. The package can then be bundled and shipped, or subjected to further processing.

U.S. Pat. Nos. 4,290,723 and 5,613,827, and Published U.S. Patent Application No. 20030031550, disclose various machinery and methods for stacking courses of lumber into packages. Unfortunately, none of these, or other known conventional stacker designs, are able to stack lumber at the high stacking rates required to keep up with the increased speed of present feed systems. Conventional systems, for example, are only capable of a maximum of about 15 cycles per minute for a single carriage stacker, and around 24 cycles per minute for a dual carriage stacker—not taking into account down time between loads being stacked and general inefficiencies of the infeed and outfeed systems of the stacker.

In addition, conventional stackers have not provided the ability to stack shorter courses of lumber at a faster rate. Typical infeed systems are often able to supply shorter courses of lumber at higher speeds, but, with no way to stack them faster, this higher feed capacity is wasted on conventional stackers. There are generally as many short lengths in a formulated layer of lumber as there would be longer lengths. This means that you have to stack 10' long, 12" wide pieces of lumber, produced at 120 pieces per minute, with 4 pieces per layer, at 30 layers per minute (120 pieces/4 pieces per layer) in order to keep up with the infeed system. This is in contrast to 20' long, 12" wide pieces that are produced at 60 pieces per minute, which would only need to be stacked at 15 layers per minute (60 pieces/4 pieces per layer). Mills therefore need to be able to stack about 30 courses per minute or more in order to keep up with the infeed of smaller lumber courses, and should also have very few timing and maintenance problems.

SUMMARY OF THE INVENTION

One objective of the present invention is to provide a stacker that is competitive in cost to build but that operates at higher speeds than conventional single or dual carriage stacker designs. According to one embodiment, the increased speed is preferably due to a simplified, positive actuating mechanism utilizing a higher degree of electronic controls. Simplified mechanical and electrical controls can result in a much faster stacking mechanism with little operation down time, lower maintenance, and less manual supervision and tuning requirements.

Dual stacking arms help stack faster, but without proper control, dual stacking arms cannot enable a fast, reliable, and efficient stacker. According to various principles of this invention, electronic control of the velocity and ramping of dual stacking arms is preferably provided to simultaneously and precisely control forward and rearward, as well as vertical, movement of the stacking arms. Precise electronic control enables the stacker to meet high production requirements with little supervision and maintenance. According to a preferred embodiment, a stacker can be made capable of cycling at approximately 35 to 40 layers per minute or more, depending on the size of the material pieces being handled.

In some traditional lumber stackers, the courses of lumber are picked up and stacked one course at a time. According to a preferred embodiment of this invention, however, the stacking machine picks up a subsequent course of lumber while the previous course is being set. To accomplish this, a high-speed stacking machine preferably includes two sets of forks (or arms) that operate complementary to one another. This significantly speeds up the rate at which the lumber is able to be stacked.

In addition to having two sets of arms working complementary to one another, the design of one preferred embodiment utilizes a rack and pinion system, driven by a linear positioning mechanism (such as a hydraulic cylinder, drive screw linear actuator, or other linear positioning device) to horizontally move and position the stacker arms. A vertical positioning device is also preferably included to raise and lower the stacker arms to the proper vertical position at the proper speed. An electronic control system can be used to precisely monitor and control the speed and ramping of the positioning systems. Precise control of the dual stacker arms, enabled through principles of this invention, allows the stacking machine to create packages of lumber at a faster rate than previous methods and machines with fewer timing and maintenance problems.

According to yet another aspect of this invention, in addition to providing the ability to stack lumber of all sizes and mixes at higher speeds, a high-speed stacker is also preferably configured to provide the ability to disengage unnecessary stacking arms. Disengaging extra stacking arms can reduce the mass that must be moved by the positioners, and thereby permit an increase in the speed of the remaining stacking arms. This is particularly advantageous in systems where sawmill and planer mill stacker infeed production equipment are able to produce a higher piece count of shorter courses. A clutching mechanism (or any other mechanical or electrical engagement/disengagement system) could be used to disengage unneeded stacking arms from the stacking process.

BRIEF DESCRIPTION OF THE DRAWINGS

The foregoing and other objects, features, and advantages of the present invention will become more readily apparent from the following detailed description of various preferred embodiments, proceeding with reference to the accompanying drawings, in which:

FIG. 8 is a schematic top plan view of a stacker illustrating a disengagement mechanism for disengaging one or more of the stacker arms from the system according to a still further aspect of the present invention.

DETAILED DESCRIPTION OF PREFERRED EMBODIMENTS

Figure 1:
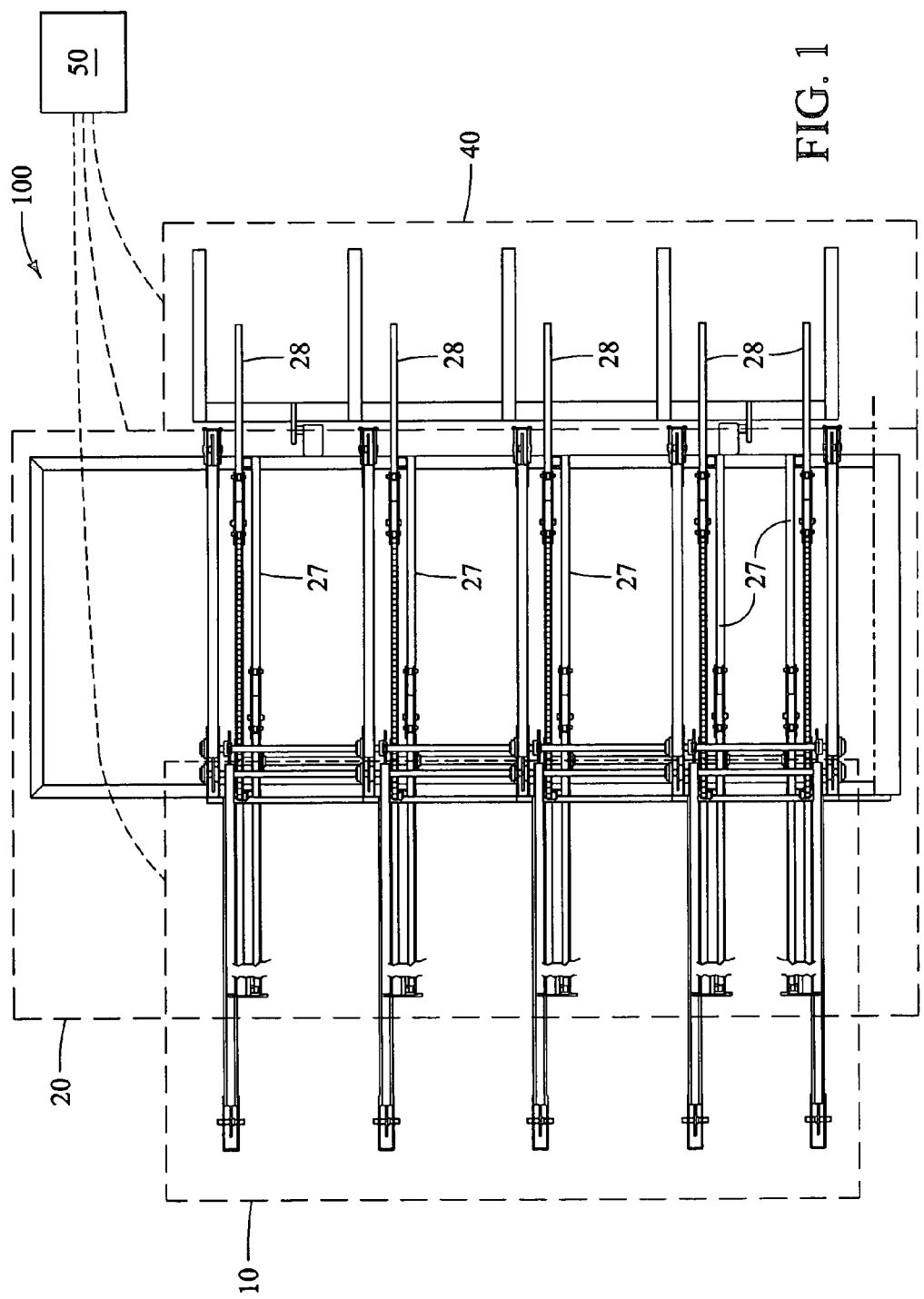
FIG. 1 is a somewhat schematic top plan view of a stacking system having a stacker with plurality of stacker arm pairs configured according to a preferred embodiment of the present invention.

Various aspects and embodiments of the present invention will now be described in greater detail with reference to the accompany drawings. Beginning with FIGS. 1–3, a high-speed stacking system 100 according to a preferred embodiment includes a stacker infeed section 10, a dual carriage stacker 20, a package lift 40, and an electronic control system 50.

The stacker infeed section 10 preferably comprises a material conveyor 12, an even ender (not shown), and a course make-up section 16. The even ender aligns ends of the material pieces 60 with one another. The material conveyor 12 carries the material 60 (such as lumber, plywood, or other material) from a material supply to the course make-up section 16 (or pre-staging area). The material 60 can, for example, be formulated into courses 60A, using the course dividing arms 24 and course stop arms 25, in the course make-up section 16 of the stacker infeed section 10. Alternatively, however, the courses 60A can be formulated in a course accumulation area arranged above stacker chains 26 in the stacker 20.

Figure 4A:
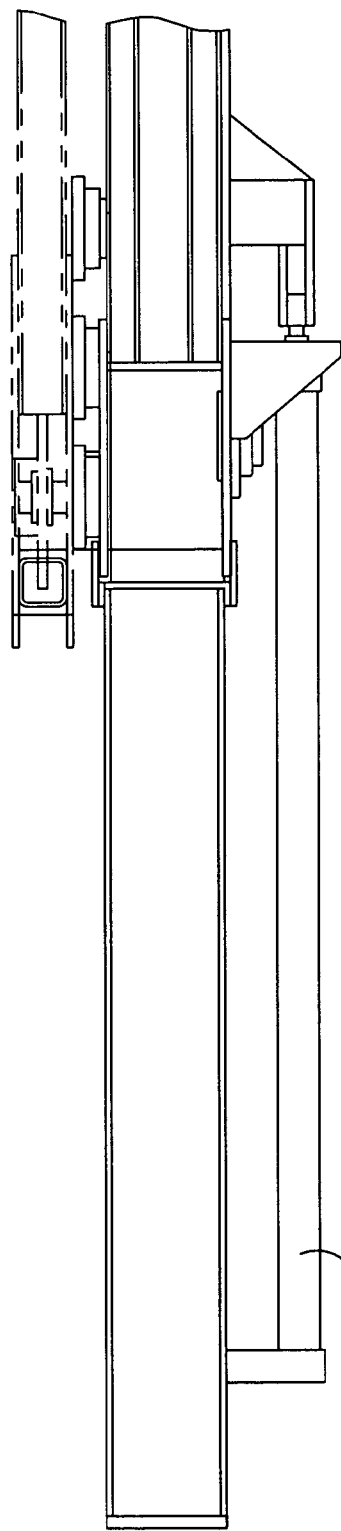
FIGS. 4A–4B are somewhat schematic top plan and side elevation views of a stacker, illustrating use of a linear positioning device to control horizontal movement of stacker arms according to another aspect of the present invention.
Figure 4B:
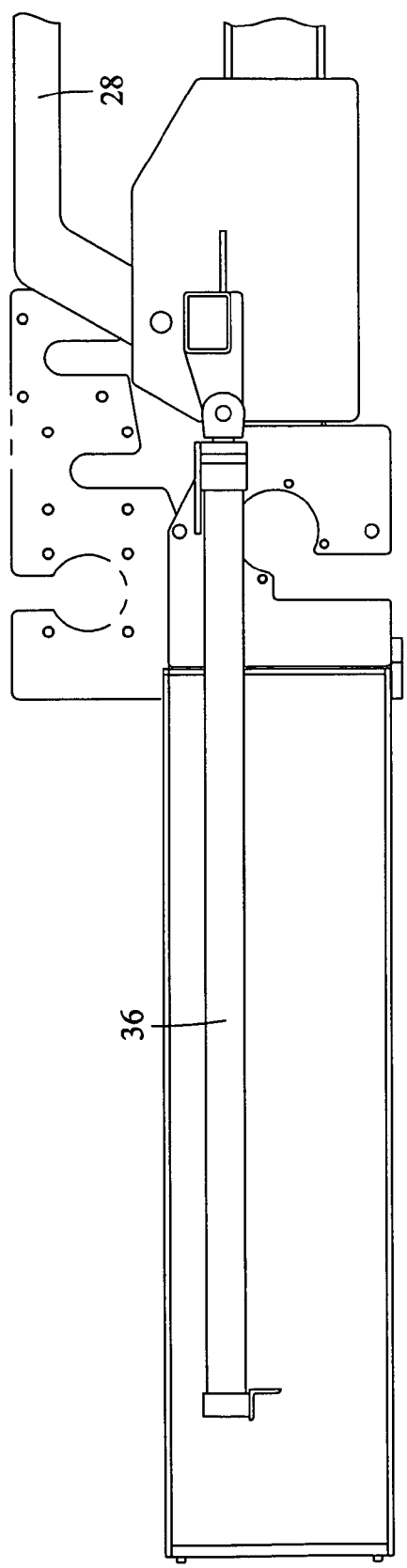

The dual-carriage stacker 20 preferably includes a structural steel frame 22, course accumulator stops (or dividing arms) 24, course stop arms (or front dropping stop) 25, stacker chains 26, stacker arms 27, 28, forward and rearward hard-coupled mechanics 30 (e.g., a rack and pinion system), and lift arms 33, 34. A horizontal, linear positioner 36 (see FIGS. 4A and 4B) is preferably provided in communication with the stacker arms 27, 28 to control their horizontal position. A separate vertical, linear positioner 38 (see FIGS. 5A–5C) is preferably provided in communication with the lift arms 33, 34 to control vertical movement of the stacker arms 27, 28. Course rake-off stops 39 are also preferably included to scrape the courses 60A off the arms 27, 28 onto the package lift 40.

Referring now to FIGS. 1 through 4B, the stacker arms 27, 28 are preferably arranged in opposing sets configured to operate complementary to each other. In this embodiment, for example, the stacker arms 27, 28 can be mounted on a rack and pinion system 30. The rack and pinion system 30 preferably includes racks 270, 280 communicating with one or more pinion gears 32. More specifically, a first set of stacker arms 27 are preferably arranged on racks 270 communicating with a top portion of the pinion gear 32. A second set of stacker arms 28 are preferably arranged on racks 280 communicating with a bottom portion of a pinion gear 32. The pinion gear 32 can include separate gear members 272, 282 formed or mounted on a common shaft 275 extending transversely through the stacker 20.

Because of their hard-coupled relationship through the rack and pinion system 30, movement of a first set of stacker arms 27 preferably creates a complementary movement in an opposite set of stacker arms 28. The horizontal positioner 36 preferably controls movement of the stacker arms 27, 28 and can, for example, be coupled to one of the arms 27 or 28 or directly to the rack and pinion system 30 in the stacker 20.

Accordingly, in this embodiment, by virtue of their mechanical relationship through the rack and pinion system 30, as one of the arms 27 is driven to its unloading position, the other arm 28 is driven to a loading position. Therefore, only one horizontal positioner 36 is required to control movement of all of the stacker arm pairs 27, 28 in the stacker 20.

Of course, numerous other embodiments incorporating the principles of this invention are also possible. In one alternative embodiment, for instance, the forward arms could all be connected to each other, with the rearward arms separately connected to each other without a hard-coupled relationship between the forward and rearward sets of arms. Simultaneous movement of the forward arms could be provided using a first horizontal positioner with simultaneous movement of the rearward arms being provided by a separate, second horizontal positioner. Separate connection between the forward set of arms and the rearward set of arms could, for instance, be provided using separate rack and pinion systems for the forward and rearward sets of arms. Alternatively, all of the arms in a set could be mechanically connected together in another mechanical relationship (such as by a rigid or other mechanical connection).

In yet another embodiment, separate horizontal positioners could be used to control movement of each stacker arm pair independently. The relationship between the arms in each pair could be controlled via a separate hard-coupled mechanical relationship, such as a rack and pinion system or other mechanical system. In still another embodiment, each stacker arm could be controlled using its own horizontal positioner. Although significantly more expensive, this approach would offer flexibility in terms of the timing and control of the arms and would provide an electronic disengagement mechanism allowing unneeded stacker arms to be disengaged from the system by simply not operating the positioners for the extra stacker arms.

Figure 5A:
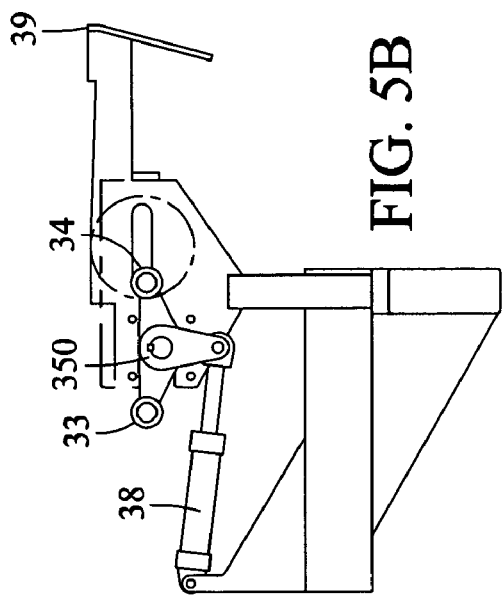
FIGS. 5A–5C are somewhat schematic side elevation views of a stacker, illustrating use of a linear positioning device to control vertical movement of stacker arms according to yet another aspect of the present invention.
Figure 5B:
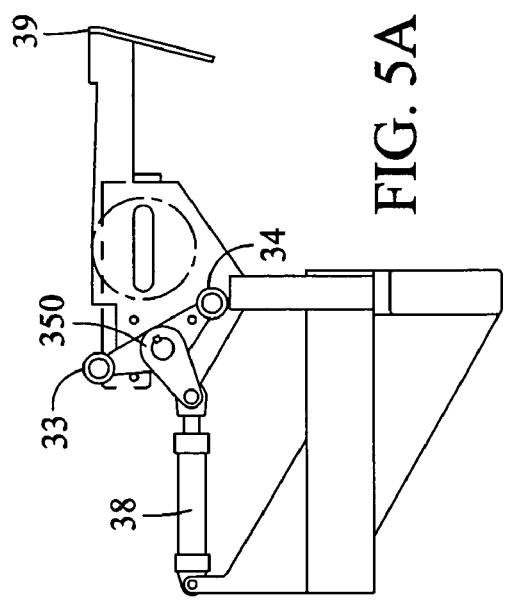
Figure 5C:
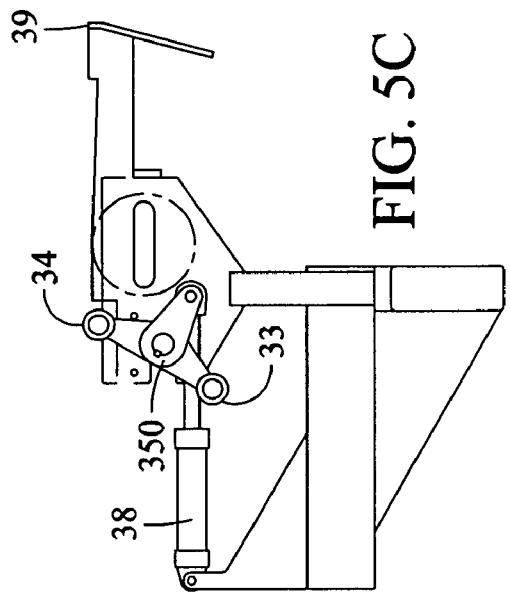

Referring now to FIGS. 5A–5C, the vertical position of all of the stacker arms 27, 28 is preferably controlled using a single vertical positioner 38. Lift arms 33, 34 are preferably arranged in pairs to communicate with a pair of stacker arms 27, 28. In this embodiment, each of the pairs of lift arms 33, 34 are preferably mounted on a common shaft 350. A shaft arm 352 is preferably coupled to the shaft 350 to cause rotational movement of the shaft in response to operation of the vertical positioner 38. For example, as shown in FIG. 5A, retraction of the vertical positioner 38 can be configured to raise a stacking arm (not shown) using one of the lift arms 33. FIG. 5B shows that arrangement of the vertical positioner 38 in a middle position allows both arms 27, 28 to be lowered, and FIG. 5C illustrates the vertical positioner 38 in an extended position, which raises a different stacking arm (not shown) using another one of the lift arms 34. By arranging all of the lift arms 33, 34 for the stacking arm pairs 27, 28 on a common shaft 350, a single vertical positioner 38 can be used to operate all of the lift arms 33, 34 in the stacker.

Of course, numerous other embodiments are also possible. For instance, all of the lift arms for forward stacker arms could be controlled by one vertical positioner, with the lift arms for rearward stacker arms controlled by a separate vertical positioner. Alternatively, a separate vertical positioner for each stacker arm pair could be used. Another embodiment could use a separate vertical positioner for each lift arm. Other embodiments could use a single lift arm to raise both stacker arms in a stacker arm pair. It should also be noted that the lift arms can be configured in any mechanical relationship with an electrically-controlled positioner that would cause them to raise the stacker arms at the appropriate time in the stacking sequence. Accordingly, the invention is not limited to the specific embodiments disclosed herein.

Figure 7:
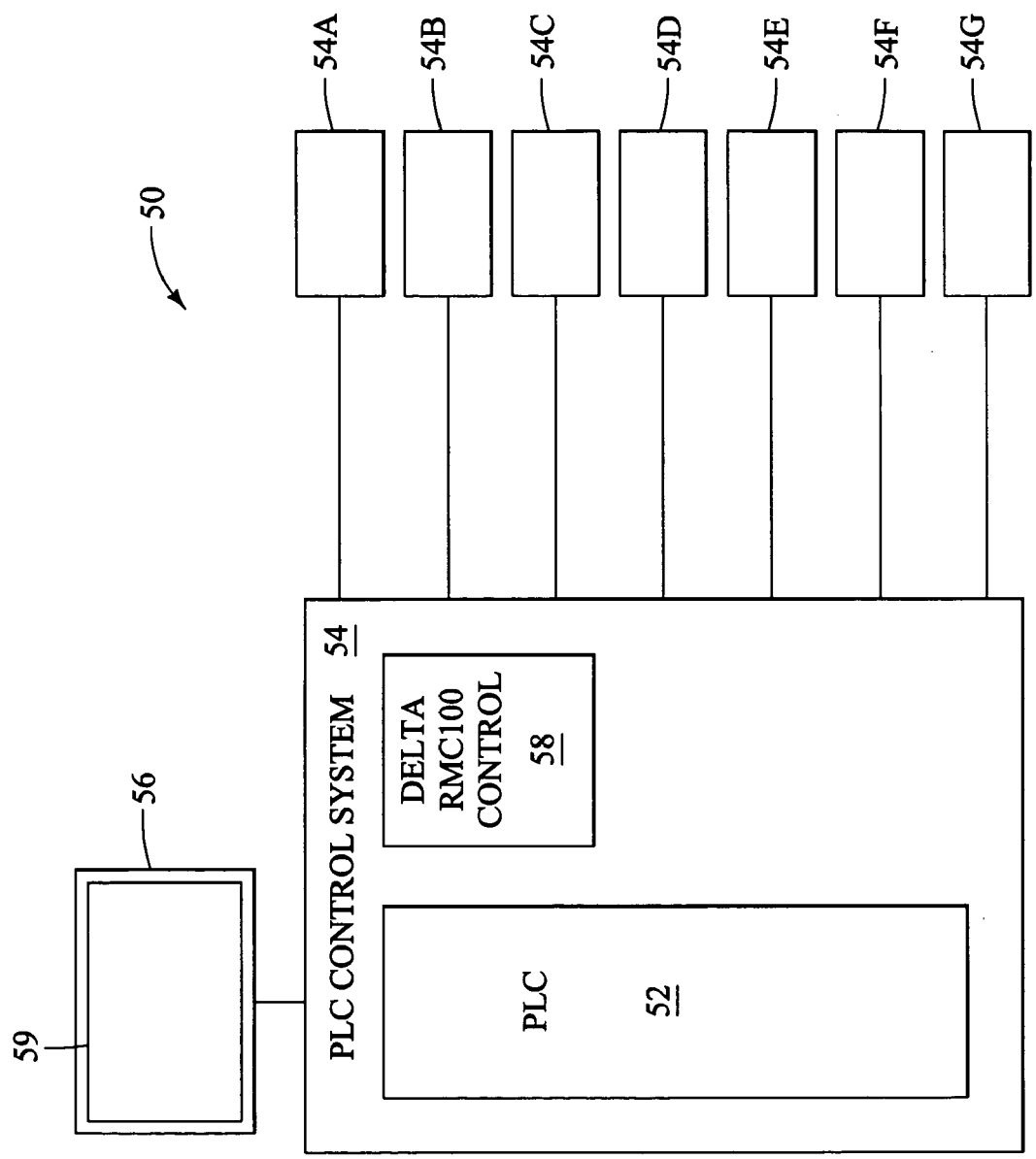
FIG. 7 is schematic block diagram illustrating an electronic control system for controlling a stacking system, according to a still further aspect of the present invention.

In operation, the vertical and horizontal positioners 38, 36 are preferably configured to operate in response to instructions from the electronic control system 50 (see FIGS. 1 and 7). Using electrically-controlled positioners 36, 38, the stacker arms 27, 28 are able to be raised and lowered to load and unload courses in a precise sequence, timed with the forward and rearward movement of the arms 27, 28.

The vertical and horizontal positioners 36, 38 are preferably electrically-controlled hydraulic cylinders, controlled through an electronic controller, such as a Temposonics feedback controller. The hydraulic cylinders also preferably include position monitoring devices that are able to precisely determine and report the position of the hydraulic shafts (or pistons) to the electronic control system 50. The speed and ramping of the hydraulic cylinders are also preferably controllable through the electronic control system 50.

Of course, other types and/or configurations of positioners are also contemplated within the scope of this invention. For instance, screw drive linear actuators, servo type positioning motor drives, electric motor drives with variable frequency internal or external positioning capability, or other positioning devices could be used in place of the hydraulic cylinders. Combinations of any or all of these types (or other types) of positioners could be used to supply the forward and rearward arm movement as well as the raising and lowering of the arms.

Regardless of the type of positioning device used, however, it is desirable to know the state of the positioner and to maintain precise electronic control over both positioning and ramping of the device. The horizontal positioner(s), in particular, are preferably configured to include an electronic positioning strip or other position detection device (arranged within or independently of the positioner) to enable determination of the horizontal positions of the stacker arms. The vertical positioners may also include position detection devices. Precise electronic control over positioning devices helps enable the stacker to operate at high-speeds without tossing material or otherwise jeopardizing the integrity of the stacking process.

FIGS. 6A–6H illustrate the operation of the embodiment of the stacking system 100 shown in FIG. 1. It is desirable to have a stacking machine that is able to create packages of lumber or other material at a faster rate than previously available. Typically, a package of lumber is created by using a set of stacker arms to raise a course of lumber from the stacker chains and move it to a stacking area. The arms are extended out to the area containing the accumulated courses. Once the course of lumber has been set, the stacker arms retreat and pick up the next course. This process is repeated until the desired number of courses have been set and a full package has been created.

Figure 2:
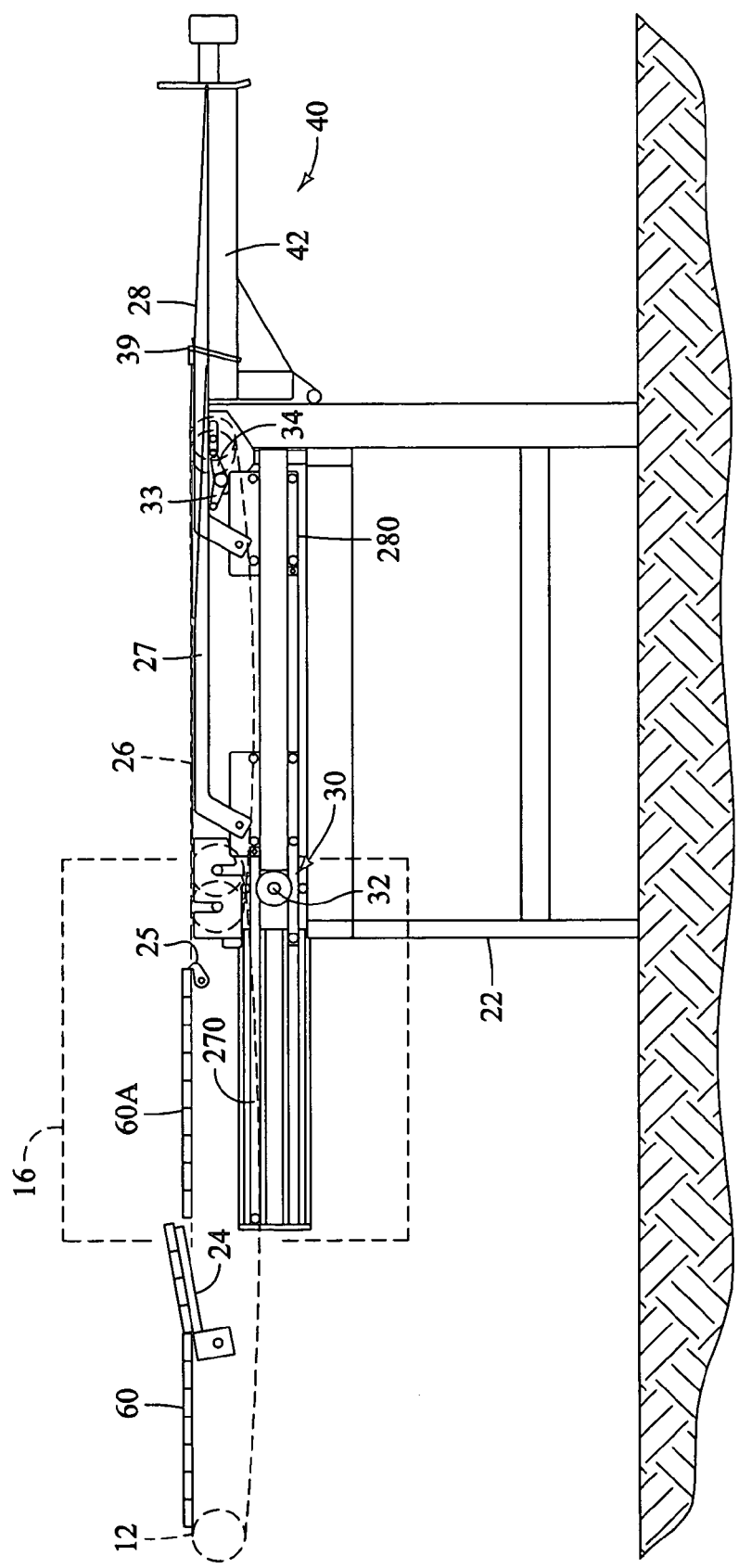
FIG. 2 is a somewhat schematic side elevation view of the stacking system of FIG. 1.
Figure 3:
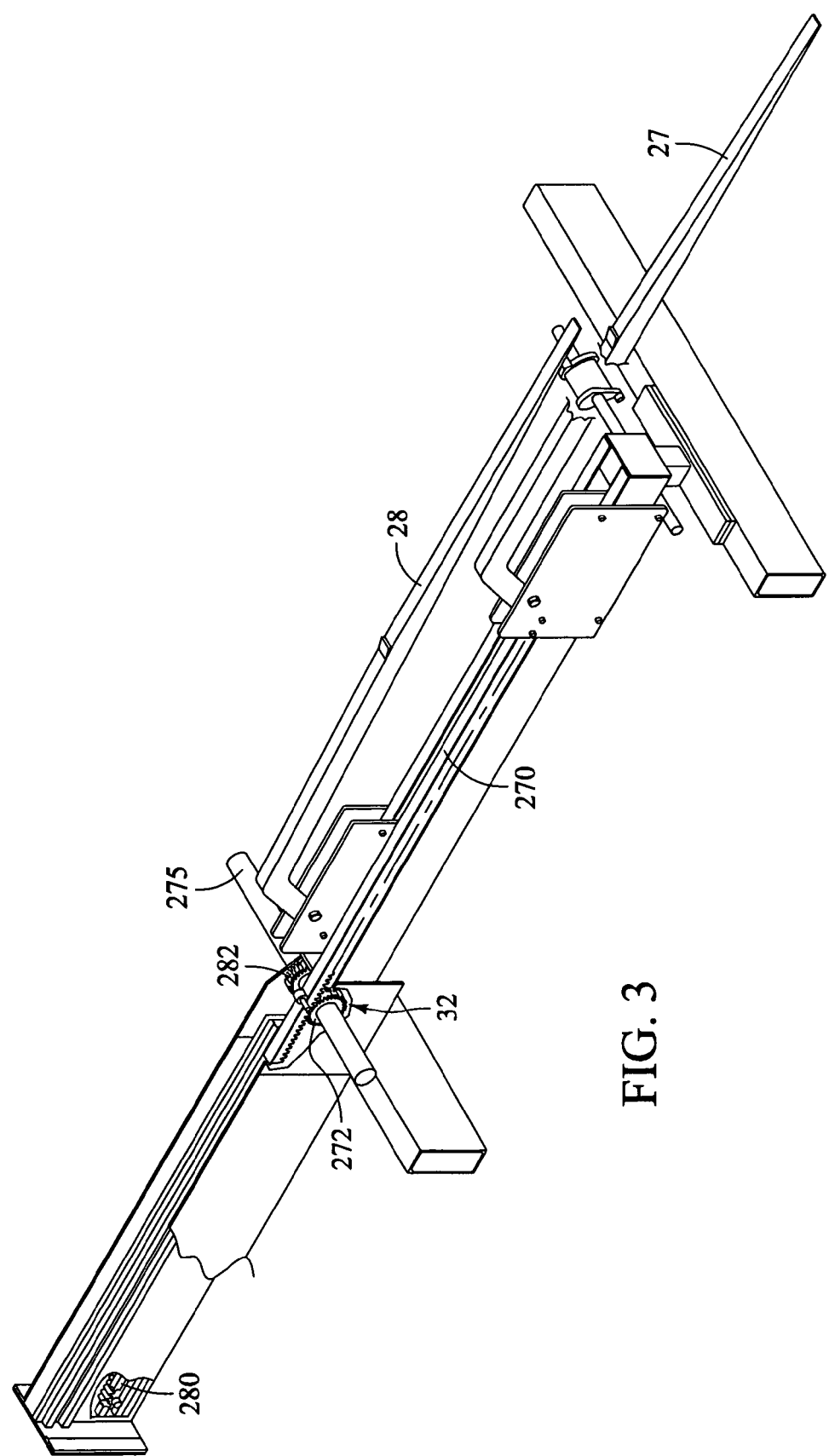
FIG. 3 is a somewhat schematic perspective view of a pair of stacking arms as used in the stacker shown in FIG. 1.

The dual-arm stacker 20 configuration according to the embodiment illustrated in FIGS. 1–3 contains two sets of forks 27, 28 that operate complementary to one another. By picking up the next course of lumber while the previous course is being set, the rate at which the lumber is stacked can be significantly increased. To provide complementary-operating sets of arms, this specific embodiment preferably utilizes a hard-coupled mechanical drive system (such as a rack and pinion system) to arrange the stacker arms 27, 28 in their back and forth horizontal positions. To achieve the necessary vertical motion of the stacking arms 27, 28, the system preferably utilizes vertical positioning arms 33, 34 (lift arms) that raise and lower the stacking arms 27, 28 to the proper vertical position.

Figure 6A:
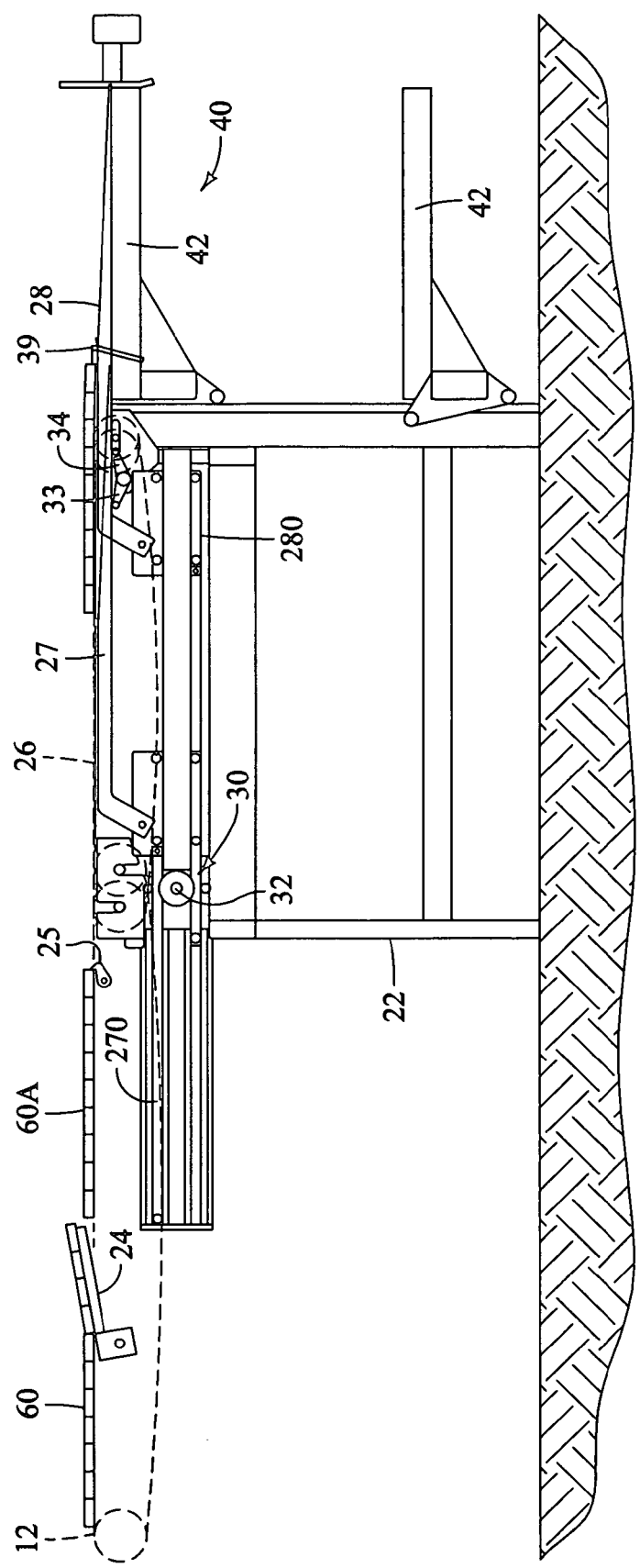
FIGS. 6A–6H are somewhat schematic side elevation views illustrating the operation of a stacker configured according to the embodiment shown in FIG. 1.

A method of stacking material according to a preferred embodiment of the present invention will now be described in more detail with reference to FIGS. 6A–6H. Referring first to FIG. 6A, as the pieces of material 60 (such as lumber) are transferred down the infeed transfer 10 to the stacker 20, a set of dividing arms 24 are preferably activated to start the formulation of, and the pre-staging of the courses 60A of material. When the dividing arms 24 are lowered, the sheets of lumber (or other material) 60 travel to a course dividing section which may be located in a separate pre-staging area or at an infeed area of the stacker chains 26. Course stop arms 25, in conjunction with the dividing arms 24, preferably limit the number of pieces of lumber 60 to the appropriate count for the course 60A.

Figure 6B:
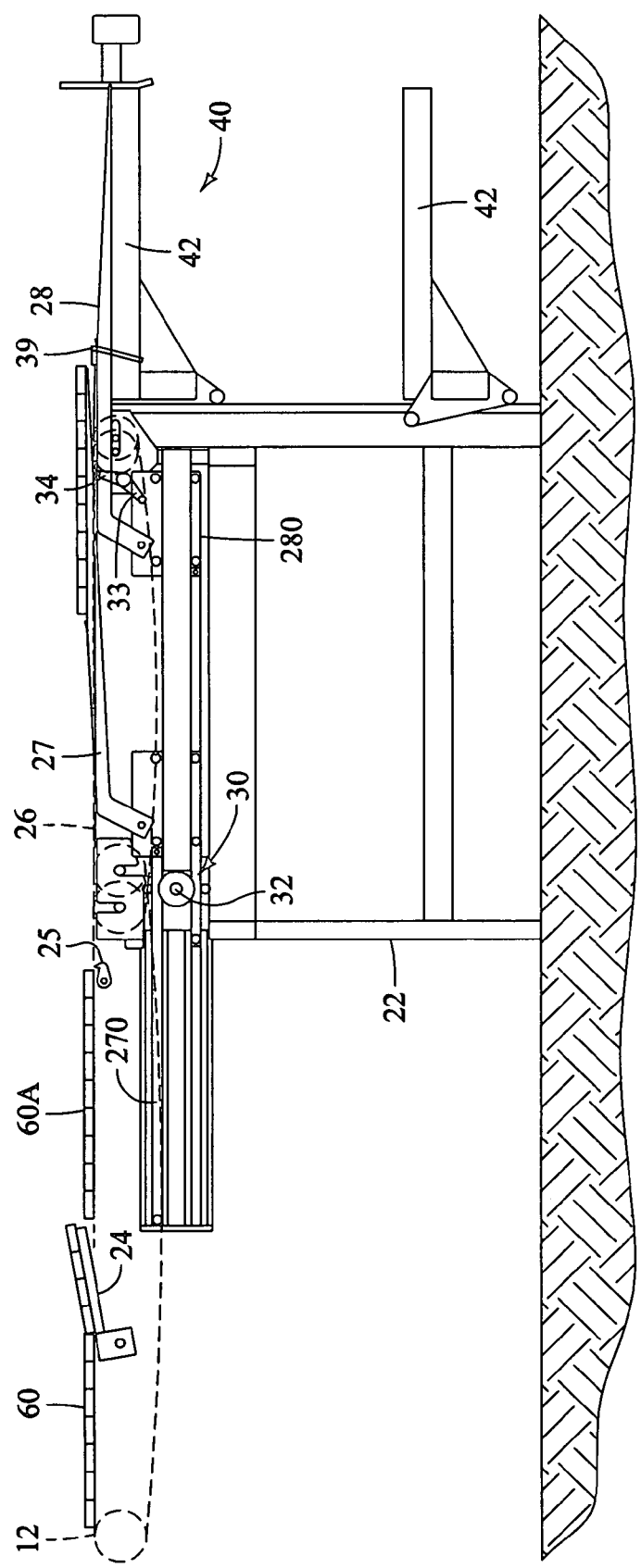

Referring now to FIG. 6B, once the course of lumber 60A is created, a rearward set of stacker arms 27 is raised, thereby picking up the course of lumber 60A. More particularly, lift arms 33 raise the fork arms 27, which in turn raise the course of lumber 60A from the chains 26.

Figure 6C:
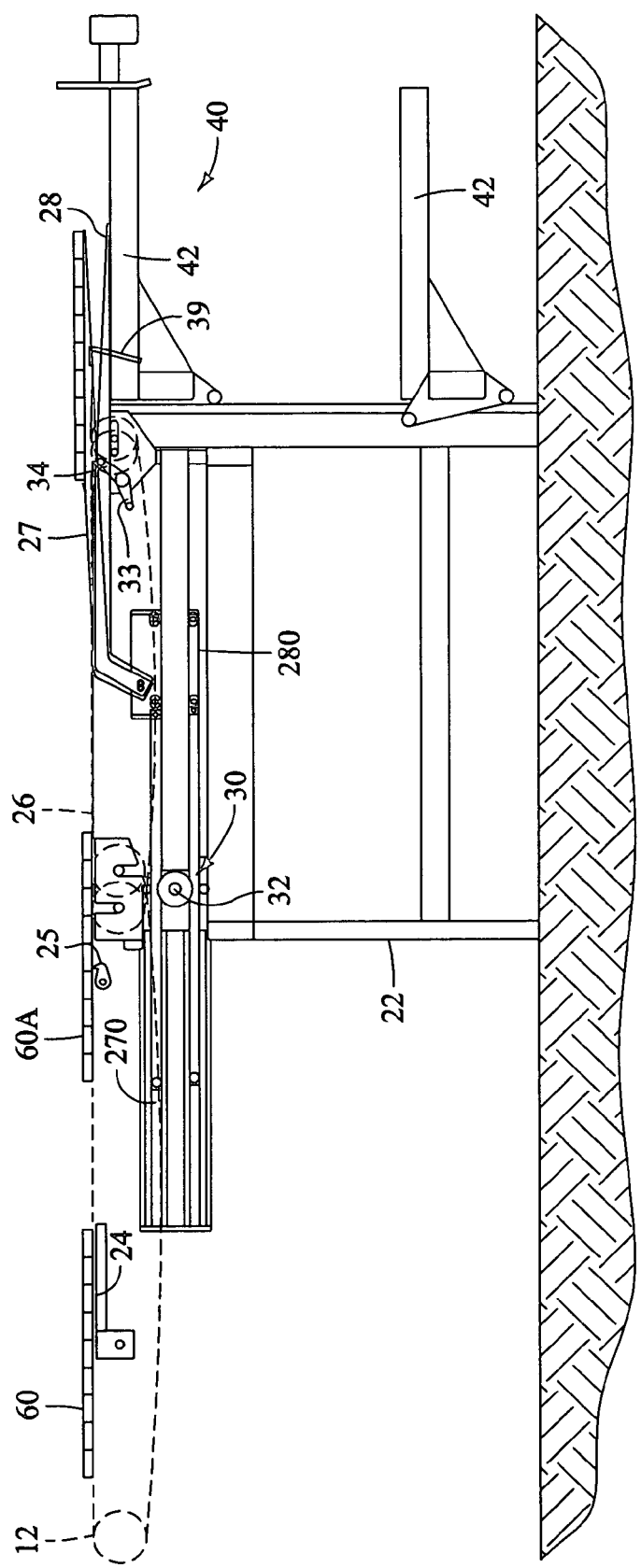
Figure 6D:
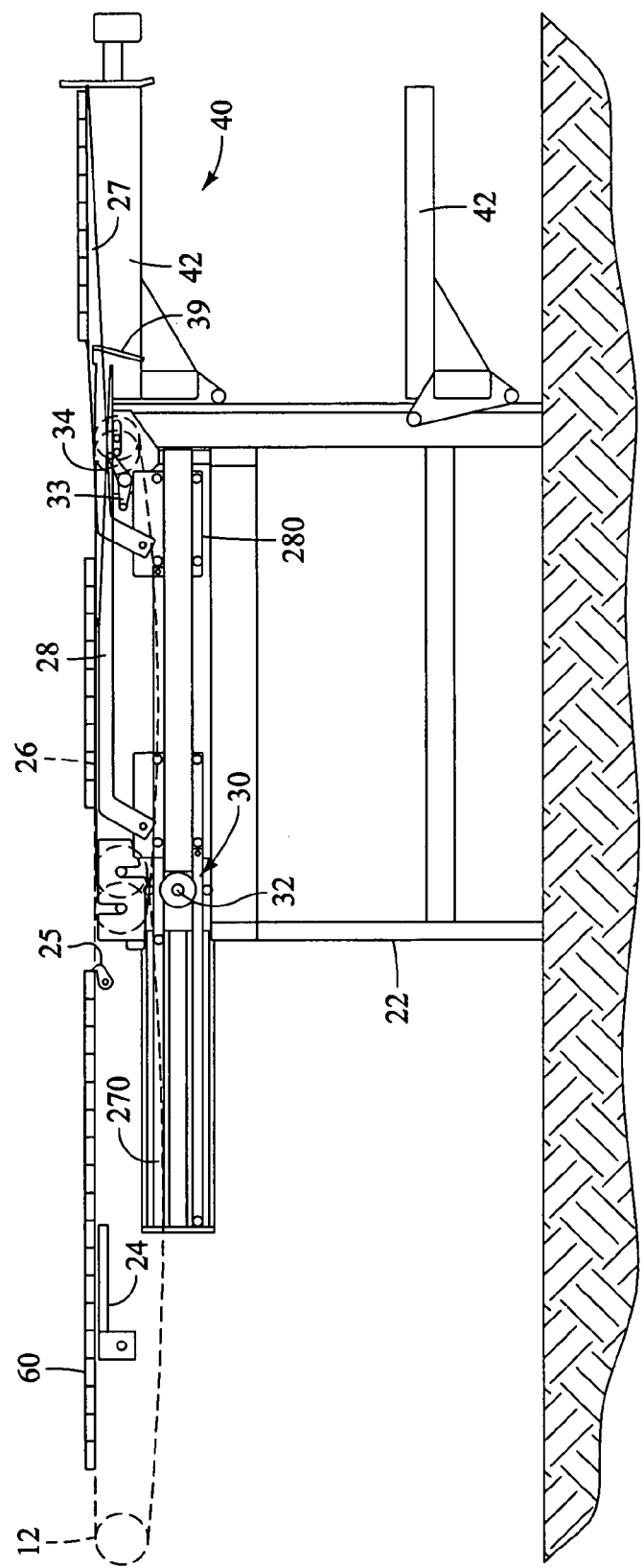

As illustrated in FIG. 6C, after the course 60A has been lifted from the chains 26, the rear forks 27 move forward with the course of lumber 60A, while the front forks 28 are moved in the opposite direction. The front forks 28 ultimately end up in the position where the rearward forks 27 had been previously (see FIG. 6D). This opposite, complementary motion can be created by the relationship of the stacker arms 27, 28 to the location of the pinion gear 32. As the pinion gear 32 rotates clockwise, the stacker arms 27 attached to the top of the pinion gear 32 move forward while the stacker arms 28 attached to the bottom portion of the pinion gear 32 move backwards. The opposite motion is created by rotating the pinion gear counterclockwise.

A hard-coupled mechanical drive system is preferably used to provide simultaneous complementary forward and rearward movement of the stacking arms. As discussed above, the mechanical drive system can comprise a gear rack and pinion gear activating mechanism for operating all of the arms simultaneously. The drive system could also comprise, however, dual sets of pinion gears on individual rack assemblies, for driving the forward and rearward arms independently. Other types of mechanical drive systems are also contemplated within the scope of this invention. However, those that provide simultaneous forward and rearward motion through a fixed mechanical relationship that does not change substantially with use or wear of the components are most preferred.

Figure 6E:
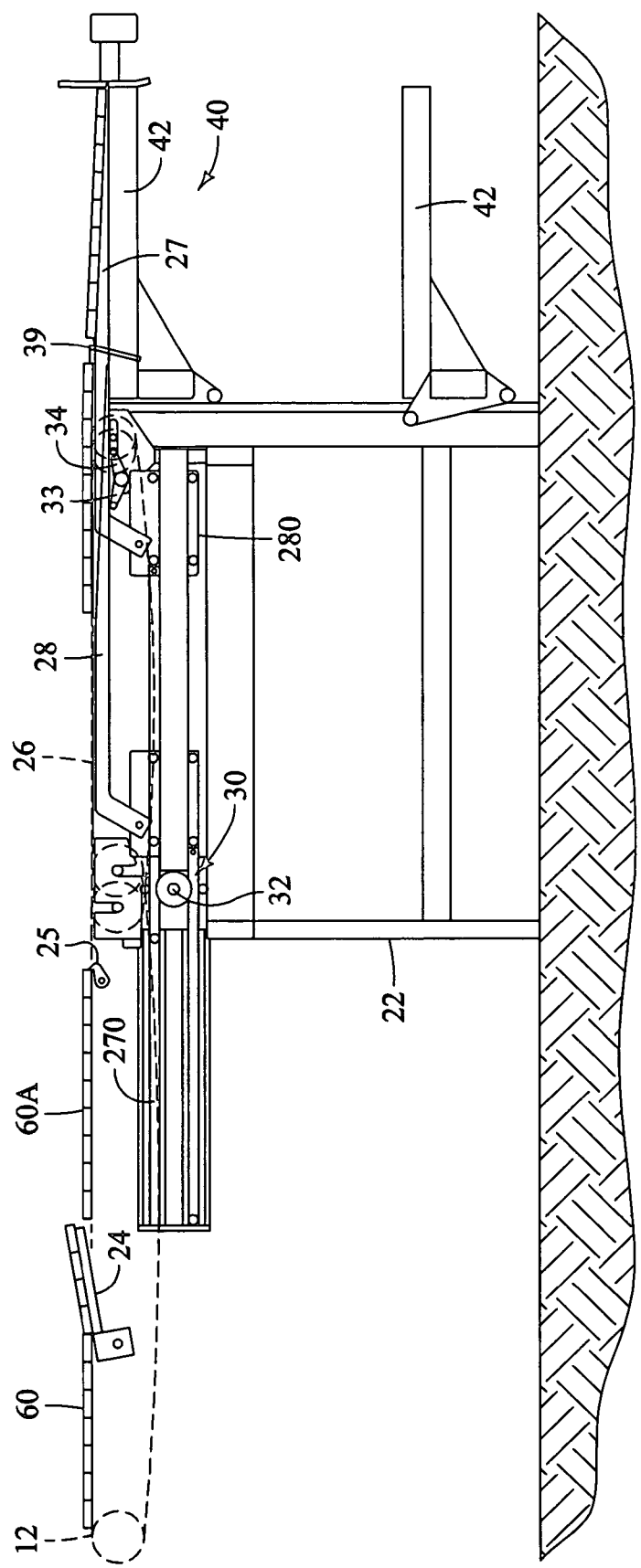
Figure 6F:
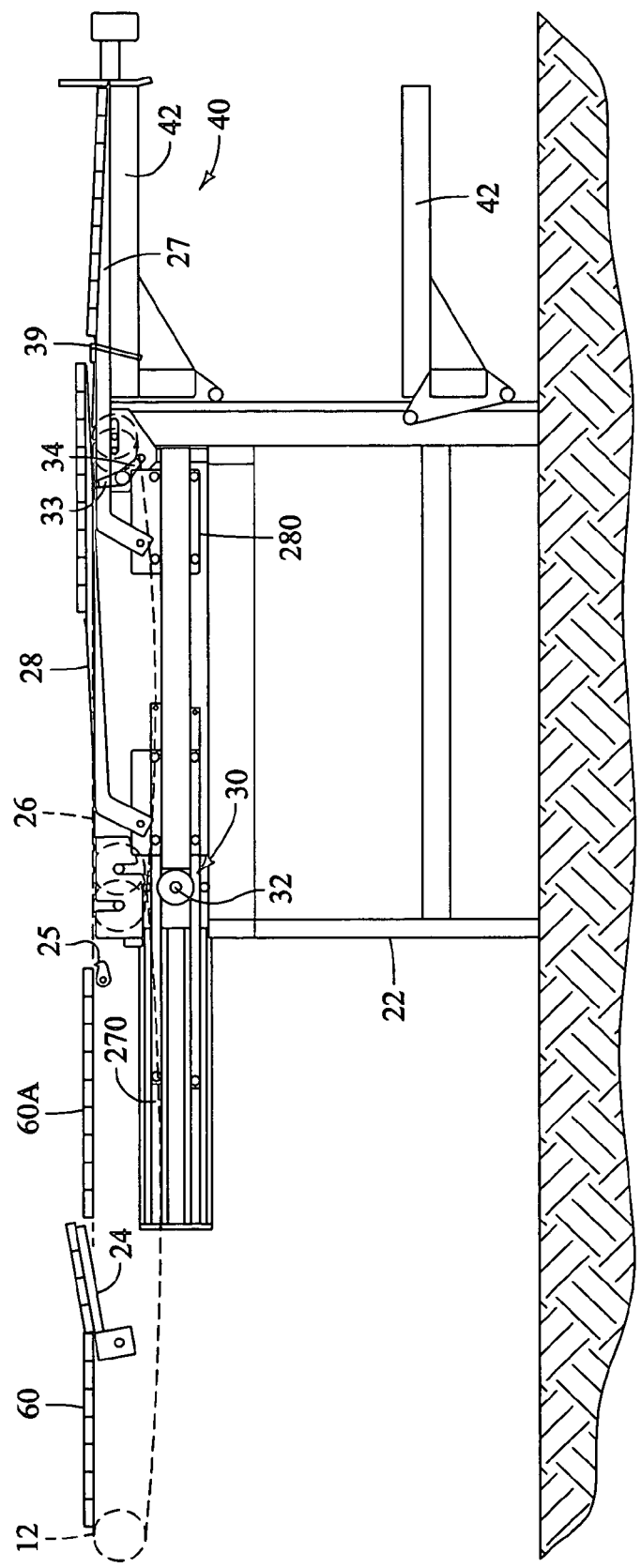

Referring now to FIGS. 6E and 6F, once the course of lumber 60A has reached the location (e.g., the package lift 40) where the lumber package is being built, the lift arms 33 lower, thereby lowering the rear stacker arms 27 and setting the course of lumber 60A in place on the package accumulation support 42 in the package lift 40. When the lift arms 33 for the rearward stacker arms 27 are lowered, the lift arms 34 for the front stacker arms 28 are lifted, thereby raising the next course 60B.

Figure 6G:
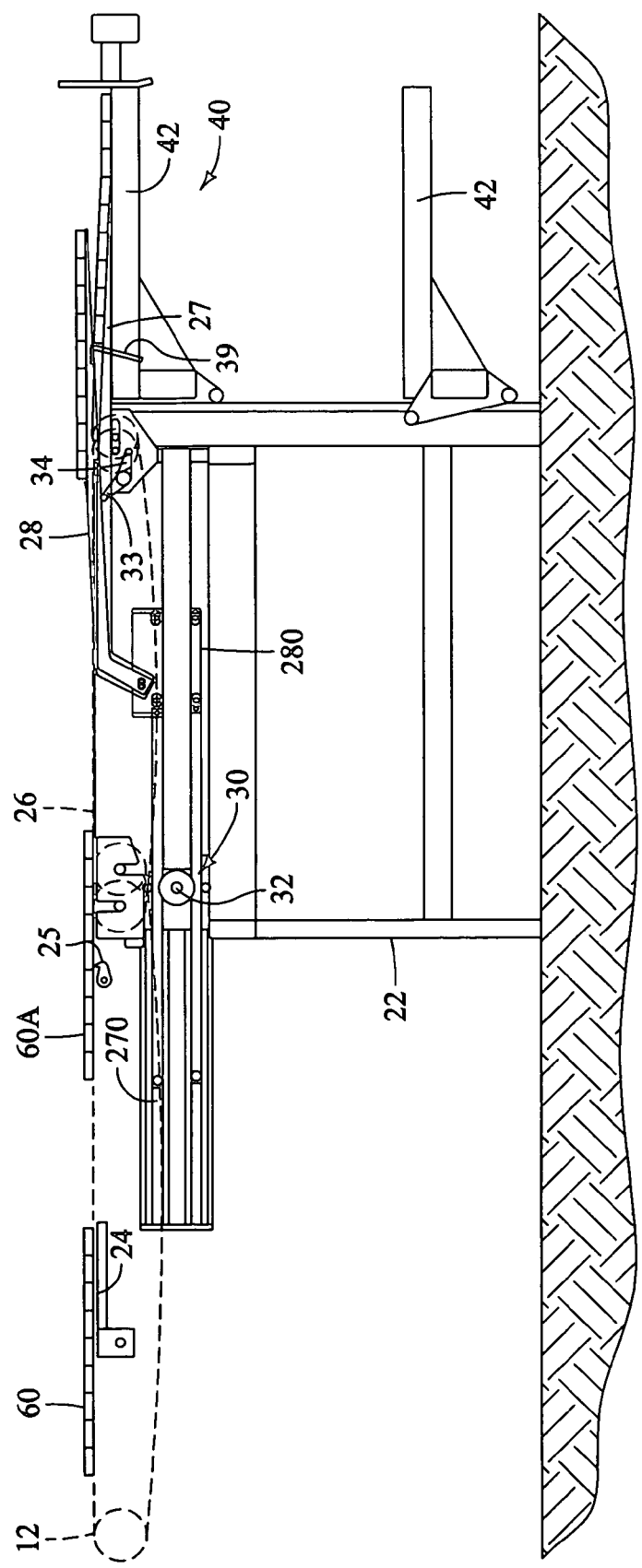
Figure 6H:
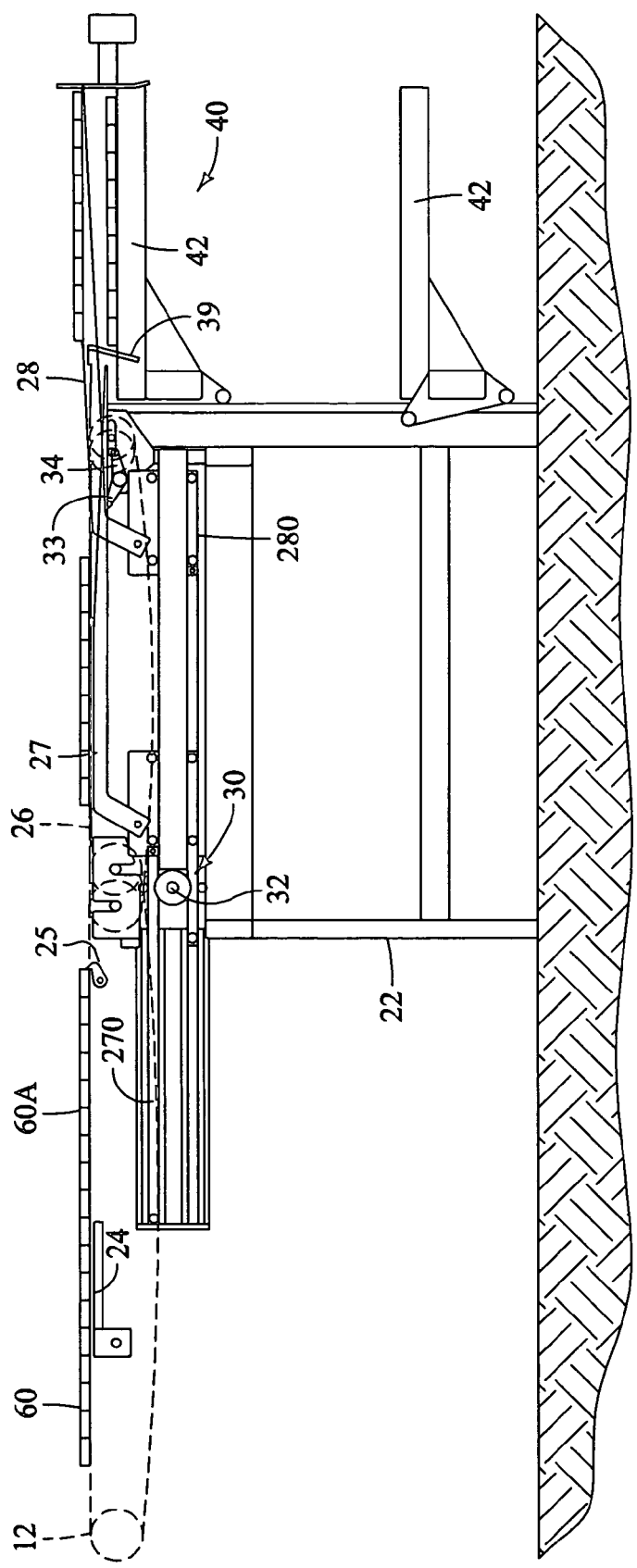

As shown in FIGS. 6G and 6H, the forward stacker arms 28 are then brought forward as the rearward stacker arms 27 are returned to their starting position. As the rearward arms 27 retreat from the package lift 40, the course 60A is scraped off the arms 27 by the course rake-off stop 39. When the forward arms 28 reach the package lift 40, the forward stacker arms 28 are then lowered using the lift arms 34 to deposit their course 60B in the package lift 40. The process is repeated until the desired package size has been achieved.

The package lift (or hoist) 40 preferably automatically adjusts the height of a package accumulation support 42 based on the number of layers accumulated thereon. In a preferred embodiment, for example, the package lift 40 can utilize positioners (not shown) to precisely place the accumulation support 42 in a proper receiving position with respect to the stacking arms 27, 28. The accumulation support 42 is thereby preferably configured to index the exact amount to accommodate successive layers. This system can reduce lost time and eliminate the need for other sensing devices that might otherwise be required.

Referring to FIG. 7, an electronic control system 50 for the high-speed stacker 20 preferably includes a PLC or PC type of positioning and sequencing software 52 loaded into a PLC or PC type of controller hardware 54, and an operators console 56. The electronic control system 50 is preferably used to control the precise position and sequencing of the stacker components to permit operation of the stacker at high-speed.

Referring now to FIGS. 1 through 7, in a preferred embodiment, a controller 54 for a dual-arm, high-speed stacking system 20 provides coordinated motion control of seven axes. These seven axes can include, for instance, a primary stacking arm (or reference) axis (which controls the horizontal positioner 36 to provide forward and backward movement of the stacking arms 27, 28), a stacking arm lift axis (controlling the vertical positioner 38 to lift and lower the stacking arms 27, 28), an infeed speed axis (providing analog speed control of the infeed chain 12), a course set-up axis (providing coordinated control of timing solenoids for the course dividing arms 24 and stop arms 25), a stacker chain speed axis (providing analog control of the speed of the stacker chains 26), a sticker or tie strip placement axis (providing control of a sticker placement positional timing solenoid (not shown)); and a hoist axis (controlling positioning of the package lift 40). Control of these seven axes preferably provides both velocity and positional coordination of each of the system components with the primary stacking arm axis (or reference axis).

As discussed earlier, the location and movement of the stacking arms 27, 28 (e.g., the primary axis) are preferably controlled through a horizontal positioner 36 (such as a hydraulic cylinder). The horizontal positioner 36 is, in turn, controlled using a controller 54A (such as a Temposonics feedback controller) in the electronic control system 50. The primary axis is therefore used to transport a course of lumber 60A from the stacker chains 26 to a package lift (or hoist) 40 that is used to accumulate multiple courses of lumber to form a complete package. Linear motion of this axis preferably includes a controlled acceleration/deceleration ramp at each end of the stroke, as well as constant velocity over a central portion of the stroke. From this primary motion, positions of the stacking arms 27, 28 can be continuously monitored to provide timing and coordination to the other axes.

More particularly, as the stacking arms 27, 28 stroke, for instance, the vertical positioner 38 (preferably a second hydraulic cylinder) can be controlled using a separate controller 54B (e.g., a second Temposonics feedback controller) in the electronic control system 50. The vertical positioner 38 positions the lift arms 33, 34 to provide lift control of the stacking arms 27, 28 based upon the position/motion of the arms 27, 28. The amount of lift can also be coordinated to maintain the arms at a fixed position above the package in the hoist 40 and, using the control system 50, can be adjusted continuously over the stroke of the arms 27, 28. In a retracted position, each stacking arm 27, 28 is preferably raised to lift a course 60A from the stacker chains 26. At full extension, each of the stacking arms 27, 28 is preferably lowered onto the top of the package in the hoist 40.

Concurrent with the cycling motion of the stacking arms 27, 28, lumber 60 is being separated into courses 60A on the infeed chains 12 and the stacker chains 26. Timed with the position of the stacking arms 27, 28, a complete course of lumber 60A is sensed from the the course separator arm 24 and the front dropping stop 25. The stacker arms 27, 28 are then raised to separate the lumber to build one course of the package. Both the incoming chains and the stacker chains 26 are preferably controlled using separate Variable Frequency Drives (VFDs) 54C, 54E to match their speed to the speed of the stacking arms 27, 28.

At the correct position in the stroke of the stacking arms 27, 28, the lumber 60 being held behind the course dividing arms 24 is released by lowering the arms 24. The lumber 60 travels forward to the course stop arm (front dropping stop) 25 at the end of the stacker chains 26. Again at the appropriate stroke, the course stop arm 25 is lowered to allow a course 60A to enter the stacker chains 26. Once the desired number of pieces have passed the stop arm 25, the stop arm 25 is raised to accumulate another course. The timing for these actions is therefore preferably based upon the position and speed of the stacking arms 27, 28. Photocell detectors can be used to monitor when a complete course has been formulated behind the front dropping stop 25. Actuation of the course separator arm 24 and stop 25 can be controlled using a positional timing solenoid controller 54D. As the stacking arms 27, 28 rise to pick up the course 60A at the end of the stacker chains 26, the stacker chains 26 may be stopped momentarily to insure proper transfer of the course 60A onto the stacking arms 27 or 28.

When the stacking arms 27, 28 carrying a course of lumber (or other material) 60A reach their full extension, it may be desirable to initiate placement of a set of stickers or tie strips on the top of, or within, the course for package drying or stability. The number of these stickers or tie strips in the package can be based upon package type and size and can be programmed within the controller. The point of initiation of this cycle can also be controlled relative to the cycle position of the stacking arms 27, 28 using the control system 50. A positional timing solenoid controller 54F can be used to control sticker placement.

After the stacking arms 27, 28 retract and the course is on top of the package in the hoist 40, the hoist 40 is preferably lowered until a photocell detector (not shown) senses the top of the package. In a preferred embodiment, the next course is kept from being lowered until the package clears the photocell detector. A positional timing solenoid controller 54G can be used to control the stacker hoist 40.

These seven axes controllers 54A–54G can provide an overall control package for monitoring and controlling the operation of a high-speed stacker system. Control and monitoring of the motors, hydraulic pumps, transfer chains, and roll cases helps to provide complete control over the timing and sequencing of the stacking system. Master control over each of the various system component controllers 54A–54G can, for instance, be provided by a Programmable Logic Controller (PLC) 54 combined with a Delta Computer Systems, Inc. RMC100 Series Servo Motion Controller 58 for the Temposonic controllers 54A. 54B. A local Touch-screen MMI Terminal 59 can also be provided for monitoring and setup of the system.

FIG. 8 illustrates an embodiment of yet another aspect of the invention, in which a disengagement mechanism 80 can be provided to the stacking system 20 to allow disengagement of one or more of the stacker arms from the system when desired, such as when stacking shorter courses. Referring to FIG. 8, a high speed stacker 20 can include a plurality of stacker arms 27, 28 operated through a horizontal positioner (not shown). One or more of the stacker arms 27, 28 can be removed from operation by disengaging them from the remaining stacking arms. In this particular embodiment, this is preferably accomplished by using a clutch 80 to disengage the extra stacker arms 27A, 28A and 27B, 28B from those that are needed to stack the course.

In this embodiment, for example, the clutching mechanism 80 can be arranged to disengage the stacker arms 27A, 28A for the fourteen foot and longer board lengths and the stacker arms 27B, 28B for the eighteen foot and longer board lengths. By disengaging stacker arms for board lengths greater than fourteen feet, shorter board lengths can be stacked more rapidly. Disengaging unnecessary stacker arms reduces the overall weight of the components required to be moved and therefore reduces the force required to be applied by the controlling cylinder(s) to overcome inertia and move the course. This also reduces wear and tear on the components.

Of course, other methods of engagement and disengagement are also within the contemplation of this invention. For example, mechanically mating shafts could be engaged and disengaged manually or using a solenoid or other electric device. Disengagement of extra stacking arms can also be accomplished in various other embodiments through other means. For example, when multiple electrically-controlled positioners are used to control separate stacking arms or stacking arm pairs, the positioners connected to the unneeded stacking arms could be caused to remain idle while only those needed for the stacking operation are used. As can be seen from the foregoing description, any mechanical or electrical method for disengaging extra stacking arms can be used to reduce system loads when stacking shorter materials. This, in turn, can provide increased efficiency and speed with respect to the remaining stacking arms.

Having described and illustrated the principles of the invention in a preferred embodiment thereof, it should be apparent that the invention can be modified in arrangement and detail without departing from such principles. Among other things, the terms "forward" and "rearward" have been used throughout the foregoing descriptions for reference purposes only and provide no limitation with respect to the structure of the various embodiments described herein. For example, the stacker arms 27, 28 are each capable of being in either a forward or rearward position. We claim all modifications and variations coming within the spirit and scope of the following claims.

What is claimed is:

1. A material stacker, comprising:
    a frame;
    a plurality of stacking arms arranged along the frame in complementary pairs;
    a plurality of independent, electrically-controlled horizontal positioners configured to position the stacking arms in a horizontal relationship with respect to the frame;
    an electrically-controlled vertical positioner, separate from the horizontal positioners, said vertical positioner configured to position one or more of the stacking arms in a vertical relationship with respect to the frame;
    an electronic control system configured to control the operation of the stacker using the electrically-controlled positioners.

2. A stacker according to claim 1, wherein one horizontal positioner is configured to control the horizontal movement and positioning of all of the stacking arms in a first set of stacking arms, and wherein a second horizontal positioner is configured to control the horizontal movement and positioning of all of the stacking arms in a second, complementary set of stacking arms.

3. A material stacker, comprising:
    a frame;
    a plurality of stacking arms arranged alone the frame in complementary pairs;
    a first electrically-controlled positioner configured to position one or more of the stacking arms in a horizontal relationship with respect to the frame;
    a second electrically-controlled positioner, separate from the first electrically-controlled positioner, said second electrically-controlled positioner configured to position one or more of the stacking arms in a vertical relationship with respect to the frame;

an electronic control system configured to control the operation of the stacker using the first and second electrically-controlled positioners; and a hard-coupled mechanical system arranged between stacking arm pairs to generate complementary horizontal movement of the stacking arms, wherein a single electrically-controlled positioner is used to position all of the stacking arms in a horizontal relationship with respect to the frame.

4. A stacker according to claim 3, wherein the hard-coupled mechanical system is a rack and pinion system.

5. A material stacker, comprising:

a frame;

a plurality of stacking arms arranged along the frame in complementary pairs;

a first electrically-controlled positioner configured to position one or more of the stacking arms in a horizontal relationship with respect to the frame;

a second electrically-controlled positioner, separate from the first electrically-controlled positioner, said second electrically-controlled positioner configured to position one or more of the stacking arms in a vertical relationship with respect to the frame; and an electronic control system configured to control the operation of the stacker using the first and second, electrically-controlled positioners, wherein the electronic control system is configured to control the speed, position, and ramping of the stacker arms by sending separate signals to the first and second positioners.

6. A material stacker according to claim 5, further comprising:

a disengagement system configured to readily physically disengage extra stacker arms from stacker arms being used to assemble a lumber package.

7. A stacker according to claim 6, wherein the disengagement system comprises a mechanical assembly for selectively engaging and disengaging a mechanical communication between the stacker arms to be operated and the extra stacker arms.

8. A stacker according to claim 7, wherein the mechanical assembly comprises a clutching mechanism.

9. An electronically-controlled material stacker, comprising:

an electronically-controlled horizontal positioning device configured to control horizontal movement of a first set of stacking arms arranged to operate complementary to a second set of stacking arms; and an electronic control system arranged in electrical communication with the horizontal positioning device and configured to vary the speed, acceleration, and positioning of the horizontal positioning device while operating to load material into the stacker.

10. A stacker according to claim 9, further comprising an electronically-controlled vertical positioning device, separate from the horizontal positioning device, configured to control a vertical position of one or more of the stacking arms.

11. A stacker according to claim 9, wherein the horizontal positioning device increases the speed of the stacking arms in a reverse direction.

12. A stacker according to claim 10, wherein the electronic control system comprises a PC or PLC device comprising software configured to control the speed, acceleration, and positioning of the positioning devices based on a position of the stacker arms.

13. A stacker according to claim 9, wherein the horizontal positioning device also controls horizontal movement of the second set of stacking arms through a hard-coupled mechanical system.

14. A method of stacking material in a stacking device, comprising:

electronically varying the speed, acceleration, and positioning of one or more positioning devices to control a horizontal movement of stacking arms arranged in complementary-operating stacking arm pairs; and electronically controlling the speed and positioning of one or more separate positioning devices to control the vertical movement of the stacking arms.

15. A method according to claim 14, wherein controlling the horizontal movement of the stacking arms comprises increasing the speed of the stacking arms while traveling in a reverse direction.

16. A method according to claim 14, further comprising using a plurality of horizontal positioning devices to vary the speed, acceleration, and positioning of a plurality of stacking arms, and varying the speed of stacking arms moving in an opposite direction to complementary-operated stacking arms.

17. A method according to claim 14, wherein controlling the vertical movement of the stacking arm comprises using the separate positioning device to drive a vertical left arm communicating with the stacking arm.

18. A method according to claim 14, further comprising automatically increasing and decreasing the speed of the stacking arms during the course of their travel to increase a stacking rate of the stacking device while reducing the risk of tossing the material to be stacked.

19. A method according to claim 16, further comprising electronically tracking the horizontal position of the stacking arms during their forward and rearward travel, and adjusting a velocity and a vertical position of each of the stacking arms in relation to their position of travel by electronically profiling the motion of each stacking arm using a similar electronic pattern.

* * * * *

UNITED STATES PATENT AND TRADEMARK OFFICE
CERTIFICATE OF CORRECTION

PATENT NO. : 6,991,423 B2 Page 1 of 1
APPLICATION NO. : 10/801524
DATED : January 31, 2006
INVENTOR(S) : Hogue et al.

It is certified that error appears in the above-identified patent and that said Letters Patent is hereby corrected as shown below:

At column 10, line 58, please replace "arranged alone the frame" with --arranged along the frame--

At column 12, line 38, please replace "vertical left arm" with --vertical lift arm--

Signed and Sealed this

Thirteenth Day of February, 2007

JON W. DUDAS
*Director of the United States Patent and Trademark Office*

US006991423C1

(12) EX PARTE REEXAMINATION CERTIFICATE (8044th)
United States Patent
Hogue et al.

(10) Number: US 6,991,423 C1
(45) Certificate Issued: Feb. 22, 2011

(54) HIGH-SPEED STACKER

(75) Inventors: Gary Wayne Hogue, West Linn, OR (US); Brian Cornelius Hogue, West Linn, OR (US); Steven M. Colligan, Portland, OR (US)

(73) Assignee: Hogue Industries, LLC, West Linn, OR (US)

Reexamination Request:
No. 90/008,119, Jul. 24, 2006

Reexamination Certificate for:
Patent No.: 6,991,423
Issued: Jan. 31, 2006
Appl. No.: 10/801,524
Filed: Mar. 12, 2004

Certificate of Correction issued Feb. 13, 2007.

Related U.S. Application Data
(60) Provisional application No. 60/520,550, filed on Nov. 14, 2003.

(51) Int. Cl.
*B65G 57/18* (2006.01)

(52) U.S. Cl. .................................. 414/791.6; 414/793.4
(58) Field of Classification Search .................. None
See application file for complete search history.

(56) References Cited

U.S. PATENT DOCUMENTS

| 3,169,646 A | 2/1965 | Mason |
| 3,606,310 A | 9/1971 | Larson |
| 3,737,052 A | 6/1973 | Lunden |
| 4,201,506 A | 5/1980 | Rysti |
| 4,264,253 A | 4/1981 | Kennison |
| 4,274,781 A | 6/1981 | Rysti |
| 4,290,723 A | 9/1981 | Johansson |
| 4,892,458 A | 1/1990 | Proulx |
| 5,613,827 A | 3/1997 | Vande Linde |
| 5,964,570 A | 10/1999 | Dimion et al. |
| 5,993,145 A | 11/1999 | Lunden |

OTHER PUBLICATIONS

Delta Computer Systems, Inc., "Delta Lumber Stacker Application Note", published on the internet, Apr. 7, 1998.
Delta Computer Systems, Inc., "Using the RMC Discrete I/O Command Mode", published on the internet, Nov. 16, 2001.
Delta Computer Systems, Inc. "Delta RMC 100 Series Data Sheets", Feb. 12, 2001. United States of America.
MTS Systems Corporation, "Temposonics Applications", Jan. 1996.
MTS Systems Corporation, "Temposonics—Compatible Products", Nov. 1997.
Brown, Henry B., "507 Mechanical Movements", pp. 34-35, Algrove Publsihing, 1868.

*Primary Examiner*—Joseph A. Kaufman

(57) ABSTRACT

A high-speed stacker preferably includes dual stacking arms configured to operate complementary to one another. Most preferably, an electronic control system is provided to enable precise control over the speed and positioning of the stacker arms in both horizontal and vertical orientations. Linear motion devices (such as hydraulic cylinders, screw drive linear actuators, or other devices) can be used to position the arms horizontally and vertically in response to instructions from the electronic control system. In operation, the electronic control system preferably controls the speed and ramping of the stacker arms to repeatedly move courses of material from a feed system to a stacking area at a rapid rate with little maintenance. The high-speed stacker can also be configured to operate fewer than all of the stacker arms to facilitate faster stacking of smaller courses of material.

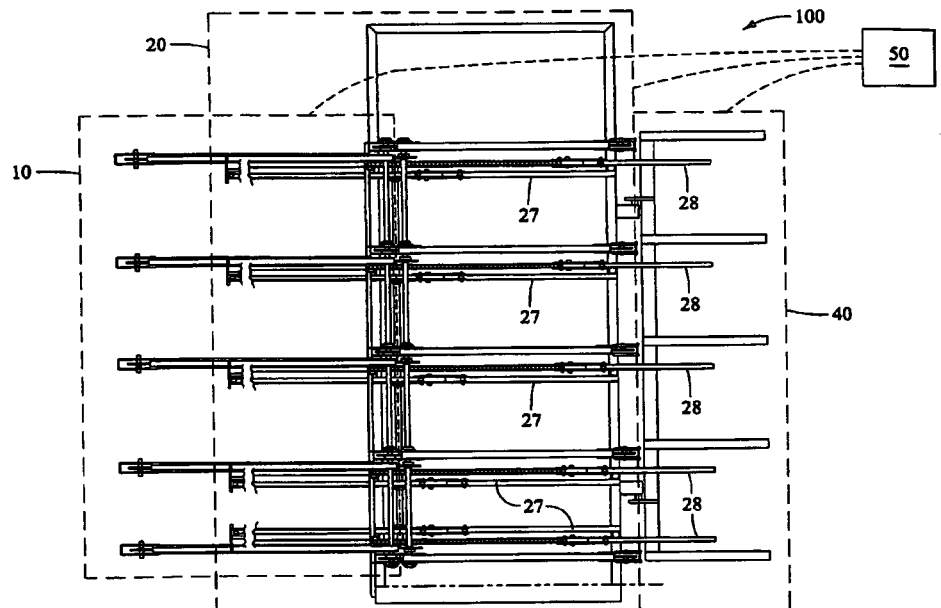

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-19 are cancelled.

\* \* \* \* \*